United States Patent [19]
Yaoi

[11] 3,804,713
[45] Apr. 16, 1974

[54] METHOD FOR THE ATTENUATION OF RUBELLA VIRUS

[75] Inventor: Hideaki Yaoi, Bodaimachi, Japan

[73] Assignee: Takeda Chemical Industries, Ltd., Osaka, Japan

[22] Filed: July 9, 1971

[21] Appl. No.: 161,925

[52] U.S. Cl. .................................. 195/1.3, 424/89
[51] Int. Cl. ............................................. C12k 7/00
[58] Field of Search ................................... 424/89; 195/1.1–1.5

[56] References Cited
UNITED STATES PATENTS
3,655,872   4/1972   Kono et al. ........................... 424/89
3,660,565   5/1972   Plotkin ................................. 424/89

OTHER PUBLICATIONS

Horta–Barbosa et al., Applied Microbiology, Vol. 18, pages 251–255, Aug. 1969.

Primary Examiner—Richard L. Huff
Attorney, Agent, or Firm—Wenderoth, Lind & Ponack

[57] ABSTRACT

Novel highly attenuated live rubella vaccines are produced by at least 10 cultivation passages of rubella virus through primary kidney cells of a guinea pig until sufficient attenuation is attained.

5 Claims, No Drawings

METHOD FOR THE ATTENUATION OF RUBELLA VIRUS

This invention relates to a method for the production of a highly attenuated live rubella vaccine, the said vaccine being not only novel and effective but also more attenuated, i.e. far less in side-effects, than those which have been hitherto known.

Rubella is a measles-like infectious disease caused by the infection of rubella virus; that is characterized by slight fever, skin eruption and lymphadenopathy which appear after an incubation period of a few weeks. While rendering no serious symptoms in case of infants and children, the disease tends to be severer in adults with accompaniment of arthritis, arthralgia or the like. Particularly when pregnants suffer from this disease at an early stage of the pregnancy, the infection extends beyond the placenta to fetus, causing the baby to have congenital rubella syndrome, such manifestations as cataracts, congenital heart failure and hearing difficulty, at a high rate. Moreover, there is observed a tendency that extensive outbreak of rubella occurs periodically. Therefore, the development of an effective means of controlling rubella has been a desideratum among physicians.

It goes without saying that the rubella is desirably to be controlled by any means, and the possibility of rubella vaccination has been extensively investigated after the discovery of rubella virus by Weller et al. and Parkman et al. in 1962. As a result, it has been shown that the rubella virus can be attenuated through serial passages in a tissue culture containing some mammalian cells or fowl embryonic cells to a grade of virulence which permits its inoculation in humans as a live attenuated vaccine and renders the immunity to the vaccinees without serious side effects.

It has been clinically proven that when an attenuated live rubella vaccine is inoculated into human infants and children, the corresponding antibody response can be obtained without rendering untoward clinical reactions, and also that those who have acquired the antibody can be protected against suffering from rubella. The rubella virus is occasionally isolated from the throat of the vaccinees, but it is known that no contact infection has ever been found in susceptible children and adults living near by.

On the other hand, however, when the hitherto-known attenuated live rubella virus vaccines are inoculated into adults, particularly into women of child-bearing age, the reactions are different from those of infants and children, and there are observed frequently so-called rubella-like symptoms such as fever, malaise, skin eruption, arthritis, arthralgia and the like. Therefore, there still remains a difficult problem in inoculating the known attenuated live rubella virus vaccines into susceptible adults.

Moreover, it is not known whether the known vaccine is completely devoid of tetratogenicity or fetal toxicity for the offspring, when it is inoculated into the pregnants.

The present inventor has found that when rubella virus is subjected to passages in a tissue culture containing primary kidney cells of guinea pig, the rubella virus can be rapidly attenuated with the lapse of the passages. Proceeding with attenuation of rubella virus in the said tissue culture, success was finally realized in highly attenuated rubella virus vaccine which does not give such undesirable side effects against human adults as mentioned above.

The principal object of the present invention is to provide a method for attenuating rubella virus, according to which a virulent rubella virus strain can be far more rapidly attenuated as compared with the known attenuation procedures for rubella virus.

Another object of this invention is to provide a method for the production of a novel and effective, highly attenuated live rubella virus vaccine with ease and at an economically realizable cost.

A further object of the present invention is to provide a highly attenuated live rubella virus vaccine which is novel and effective but does not produce, after vaccination the rubella-like symptoms and the tetratogenicity or the fetal toxicity, both having been difficult to completely eliminate from the hitherto known rubella virus vaccines.

Said objects are realized by subjecting rubella virus to at least 10 times of passages in a tissue culture containing primary kidney cells of guinea pig until a sufficient attenuation is attained.

According to the method of the present invention, any strain of rubella virus can be employed as the seed rubella virus. As the examples of rubella virus strains, there may be enumerated To–336, Yo–25, M–33, Ko–1, Brown, No–1 and the like. Among many rubella virus strains employed in the present invention, the rubella virus Strain To–336 is especially advantageously employed in the present method for producing a highly attenuated rubella virus vaccine.

The rubella virus Strain To–336 has been isolated from a throat swab of a girl suffering from German measles in Japan and its subculture has been deposited at American Type Culture Collection, Maryland, U.S.A. under the accession number of ATCC–VR–553. The preparation of rubella vaccines from this strain are disclosed in U.S. application Ser. No. 812,385, filed Apr. 1, 1969, of Kono et al. now U.S. Pat. No. 3,655,872.

The primary kidney cells of guinea pig to be employed in the method of the present invention can be prepared in a per se established manner. Rubella virus is inoculated in a tissue culture which contains said cells together with a suitable tissue culture medium, and is incubated stationarily or rotationally for about 5 to about 10 days (usually about one week). The incubation is practically conducted at a temperature of about 28°C to about 36°C, most advantageously about 29°C to about 32°C. Thus, propagated virus is then inoculated into a fresh tissue culture containing the said cells for the subsequent passage as it is or after a suitable dilution. As such passage is repeated successively, the attenuation of the rubella virus proceeds rapidly.

As the tissue media to be employed, there may be counted, for example, Hanks' solution, Earle's solution, Gey's solution, TC medium 199, Eagle's medium, and the like. These media may be supplemented, as occasion demands, with suitable ingredients, e.g. lactalbumin hydrolyzate, inactivated calf serum and so on. Furthermore, there may be added to the media an antibiotic or antibiotics such as penicillines, streptomycin, dihydrostreptomycin, neomycin or kanamycin so that the culture may be protected against propagation of adventitious microorganisms by accidental contamination.

In such a manner, the rubella virus is repeatedly subjected to the passages of cultivation until it is confirmed that the virus has sufficiently been attenuated, by a tentative inoculation into seronegative animal or human body susceptible to rubella virus. Though the times of passages required for the sufficient attenuation vary with the virulency of rubella virus employed, the incubation period of one passage and the like, generally requires at least 10 passages. Thus, rubella virus can be far more rapidly attenuated by passages in the tissue culture containing the primary kidney cells of guinea pig as compared with the known attenuation procedures for rubella virus (refer to Test 2 detailed hereinafter).

The said attenuation of rubella virus, can be further facilitated by applying the limiting dilution technic in the passages with the tissue culture containing the primary kidney cells of guinea pig (refer to Test 3 detailed in hereinafter). In the application of the limiting dilution technic, the culture fluid of the preceding passage is serially diluted by a dilution factor from 2 to 10. Each of the diluted fluids is inoculated into a tissue culture containing the primary kidney cells and incubated to determine the highest dilution for the propagation of the virus in the said passage. The culture fluid obtained from the seed virus fluid of the highest dilution is employed as the seed virus for the next passage. The limiting dilution technic may be applied to any optioned passage or passages in the series of passages with the tissue culture containing the said primary kidney cells.

As occasion demands, several passages of rubella virus with the tissue culture of the said cells may be conducted by inserting several passages with a tissue culture of other animal cells thereinto. As such other animal cells there may be included, for example, embryo cells of quail, duck, chicken or the like. Among these cells, it is especially preferable to insert one to five times of passages with embryo cells of quail into the main passages with the primary kidney cells of guinea pig.

Thus attenuated rubella virus is used as the seed virus for the production of the highly attenuated rubella virus vaccine of the present invention. The seed virus is inoculated and incubated in a tissue culture for the vaccine production, e.g. those containing the primary kidney cells of guinea pig or of rabbit, in a per se known manner. It is recommended that the virus be allowed to propagate in a culture medium not containing substances that may act as an antigen when the resulting vaccine is inoculated into human body.

From the culture fluid thus obtained, solid materials such as cells, cell fragments or the like are removed, for example, by means of filtration or centrifugation, and the filtrate or the supernatant fluid can be used, as the product of the present invention, per se or diluted with a suitable diluent such as physiological salt solution or distilled water, depending on its virus titer.

While the highly attenuated rubella virus vaccine thus produced is ready for use, it can be preserved in a frozen form with or without addition of one or more stabilizing agents such as sucrose, lactose, glutamates, phosphates and the like. Alternatively, it may be lyophilized with or without addition of one or more of stabilizing agents such as human serum albumin, gelatin and the like for its storage, and the lyophilized product is dissolved upon its use with a suitable diluent such as physiological salt solution or sterile distilled water.

For a satisfactory vaccination, it will be required to inoculate at least $10^{2.0}$ InD$_{50}$ (50% Interfering Dose) of virus titer per person, preferably subcutaneously and in one-time administration. Particularly preferable dose is about $10^{2.5}$ to $10^{3.5}$ InD$_{50}$.

For the subcutaneous inoculation, a dose of the necessary virus titer is to be contained in an aqueous composition of about 0.1 to about 1.0 ml., desirably 0.25 to 0.5 ml., in volume. Thus, the vaccine of the present invention is to be adjusted, at the use, so as to comprise the highly attenuated rubella virus in a rubella virus titer of at least $10^{2.0}$ InD$_{50}$/ml., desirably about $10^{2.5}$ to $10^{4.5}$ InD$_{50}$/ml., and a physiologically acceptable carrier therefor.

When the highly attenuated rubella virus vaccine thus produced is inoculated into infants and children, there is subsequently observed a remarkable elevation of the antibody level in serum which will prevent them from infection of rubella virus. When the vaccine is applied to adults, inclusive of women of fertilizable age, there is also observed increase of the serum antibody in blood, and it is noteworthy that there are observed no rubella-like symptoms which are considered to be undesirable side-effects often occurring in consequence of vaccination by the hitherto-known rubella virus vaccines. Thus, the novel and highly attenuated rubella virus vaccine of this invention can be used safely even for adults to be effectively immunized against rubella virus infection.

The present invention will be demonstrated in further details by way of the following Examples. Then, the safety of the highly attenuated rubella virus vaccine of the present invention will be further explained by way of examples of Tests. Throughout the specification as well as in the following Examples and Tests, abbreviations "g.", "ml." and "r.p.m." mean "gram(s)", "milliliter(s)" and "round(s) per minute", respectively.

EXAMPLE 1

Kidneys are removed aseptically from healthy guinea pigs. The kidneys (referred to as GPK hereinafter) are washed with Hanks' balanced salt solution[1] and are minced. The minced tissue is suspended in about 50-fold volume of a 0.25%-trypsin-supplemented Hanks' solution, and is digested under agitation. The resulting free cells are collected by centrifugation at 1,000 r.p.m. for 5 minutes, and diluted with such an amount of a lactalbumin Hanks' solution [2], to which 5% of inactivated calf serum is supplemented, that the resultant cell suspension contains about $5 \times 10^5$ cells per milliliter. The suspension is incubated stationarily in bottles of 50 ml. capacity at 36°C. After 7 days when the cells have firmly propagated on the inside wall of the bottles, the cells are washed three times with TC medium 199[3] to prepare a primary cell culture of GPK.

0.2 ml. of 10-fold-diluted fluid of a rubella virus strain, which has been isolated from a rubella patient and passaged 13 times with primary kidney cells of African Green monkey (referred to as AGMK hereinafter), is inoculated into the GPK cell culture and is kept standing at 37°C for 90 minutes. Then, the culture fluid is discarded, and the cells are washed five times with TC medium 199. Finally, 5 ml. of TC medium 199, to which 2% of inactivated calf serum is supplemented, is added to the bottle, and incubation is carried out at 32°C for 7 days. The culture fluid is centrifugal at 3,000 r.p.m. for 5 minutes to separate a supernatant, which is to be used as the seed virus in the next passage after dilution to 10-fold volume by TC medium 199.

In this manner, the passage with the GPK tissue culture is repeated 45 times, and the culture fluid of the 45th culture is centrifuged to obtain a highly attenuated seed virus for the production of a rubella virus vaccine.

Ten ml. of the 10-fold-diluted seed virus is inoculated to a primary cell culture of rabbit kidneys (referred to as RK hereinafter) in Roux bottles of 500 ml. capacity, which is prepared in the same manner as mentioned above, and kept standing at 37°C for 90 minutes. The fluid is discarded, and the cells are washed five times with TC medium 199. Then, 40 ml. of a serum-free TC medium 199 is added to the bottles, and incubation is conducted at 32°C for 7 days. The resulting culture fluid is centrifuged at 3,000, r.p.m. for 5 minutes to give a supernatant, being a highly attenuated rubella virus vaccine. The supernatant shows a rubella virus titer of $10^{3.5}$ $InD_{50}$/ml. assayed with the system of ECHO–11[4] and AGMK.

The product is frozen for storage at −70°C. After 100 day storage, it is thawed and diluted three times by volume with physiological salt solution. The diluted vaccine is subcutaneously inoculated to an arm to exhibit the desirable effect of immunization in human adults as well as in children and infants.

Remarks:

1) Hanks' balanced salt solution consists of:

| | |
|---|---|
| NaCl | 8.0 g. |
| KCl | 0.4 g. |
| $CaCl_2$ | 0.2 g. |
| $MgSO_4 \cdot 7H_2O$ | 0.2 g. |
| $Na_2HPO_4 \cdot 2H_2O$ | 0.06 g. |
| $KH_2PO_4$ | 0.06 g. |
| $NaHCO_3$ | 0.25 g. |
| d-Glucose | 1.0 g. |
| Phenol red | 0.02 g. |

Distilled water (tripple-distilled), an amount to make the total 1 liter.

2) Lactalbumin Hanks' solution is prepared by dissolving 5 g. of lactalbumin hydrolyzate in the Hanks' balanced salt solution to make the total 1,000 ml.

3) TC medium 199 is a sterile aqueous solution adjusted to pH 7.2 containing amino acids, purine bases, pyrimidine bases, vitamins, sugars, nucleotides, inorganic salts, etc. The detailed composition is described in: e.g.,
Morgan, J. F. et al; Proc. Soc. Exp. Biol. Med., 73 pp. 1 to 8 (1950).

4) ECHO–11 means ECHO virus Type 11 (Gregory strain), the strain being frequently used for the infectivity assay of rubella virus. Reference is made to, e.g., "New Eng. J. Med.", 275, 569–574, 1966.

EXAMPLE 2

In this Example the same rubella virus strain as employed in Example 1 is subjected to 10 times of passages with application of limiting dilution technic.

Thus, fluid of the seed virus is diluted with TC medium 199 by serial 5-fold dilution from $1 : 5^2$ to $1 : 5^9$ and 0.2 ml. each of the diluted fluids is inoculated into a GPK cell culture in 10 bottles of 50 ml. capacity, which is prepared in the same manner as in Example 1, and incubated for 7 days under the same conditions as in Example 1. The respective culture fluids are centrifuged at 3,000 r.p.m. for 5 minutes to obtain supernatants, which are subsequently frozen for storage at −70°C.

The limiting dilution for the virus propagation in the said passage is determined in the following interfering method employing Vesicular stomatitis virus:

The cells separated from the fluids as above are, after being washed twice with Hanks' balanced salt solution, inoculated with 100 $TCID_{50}$ (50% tissue culture infectious dose) of Vesicular stomatitis virus and incubated at 36°C for 2 days in 5 ml. of TC medium 199 supplemented with 2% of inactivated calf serum. Then, the respective cells are microscopically observed for evidence of cytopathic effects caused by Vesicular stomatitis virus to determine the highest dilution for the propagation of the virus.

Among the supernatants above-stored only those obtained from the seed virus fluid of the higest dilution are thawed. The thawed fluids are diluted with TC medium 199 by serial 5-fold dilution from $1 : 5^2$ to $1 : 5^9$. 0.2 ml. each of the diluted fluids is inoculated into fresh GPK cell culture in 10 bottles of 50 ml. capacity, and incubated under the same conditions as mentioned above. The highest dilution for the virus propagation is again determined in the above-mentioned manner and the culture fluids obtained from the seed virus fluid of the highest dilution is employed as the seed virus in the next passage after diluted by serial 5-fold dilution.

In this manner, the passage with the GPK cell culture is repeated 10 times with application of limiting dilution technic, and the culture fluid of the 10th culture is centrifuged to obtain a highly attenuated seed virus for the production of a rubella virus vaccine.

The seed virus is inoculated in the RK cell culture in Roux bottles and processed in the same manner as in Example 1 by the use of a serum- free TC medium 199, to produce a highly attenuated rubella virus-vaccine. The vaccine shows a rubella virus titer of $10^{4.0}$ $InD_{50}$/ml. assayed with the same system as in Example 1.

In the same manner as in Example 1, the product is frozen for storage, and thereafter thawed and used for vaccination to give satisfactory immunization in human adults as well as in children and infants.

EXAMPLE 3

Quail embryos (referred to as QE hereinafter) are aseptically removed from the eggs of the 5th day of incubation and, after cutting off the heads, are processed in the same manner as in Example 1 to prepare a QE cell culture.

In the cell culture is inoculated the same rubella virus strain as employed in Example 1 and incubated under the same conditions as stated in Example 1. The passage with the QE cell culture is repeated twice. The culture fluid of the second culture is centrifuged to obtain a supernatant. The supernatant is inoculated in a GPK cell culture in bottles which is prepared in the same manner as in Example 1. The inoculum is incubated under the same conditions as stated in Example 1. The supernatant obtained by centrifugation of the resulting culture is diluted to 10-fold volume and inoculated into fresh GPK cell culture. Thus, passage with the GPK cell culture is repeated 20 times. Then, passage with the QE cell culture is repeated twice and further ten passages with the GPK cell culture are conducted.

Thus-obtained seed virus is inoculated to the RK cell culture in Roux bottles of 500 ml. capacity and processed in the same manner as in Example 1 by the use of a serum-free TC medium 199, to give a highly attenuated rubella virus vaccine. Thus-obtained vaccine shows a rubella virus titer of $10^{3.6}$ InD$_{50}$/ml. assayed with the same system as in Example 1.

In the same manner as in Example 1, the product is frozen for storage, and thereafter thawed and used for vaccination.

The QE cells used in this Example are to be negative to the COFAL test (refer to e.g. Sarma, P. S. et al; Virology, 23, 313 et seq. (1964)).

EXAMPLE 4

0.2 ml. of 100-fold-diluted fluid of rubella virus, Strain To–336, passaged seven times with AGMK cells, is inoculated in a GPK cell culture in bottles of 50 ml. capacity which is prepared in the same manner as in Example 1. The inoculum is incubated under the same conditions as stated in Example 1. Thus, the passage with the GPK cell culture is repeated 19 times, and the culture fluid of the 19th culture is centrifuged to obtain a highly attenuated seed virus for the production of a rubella virus vaccine.

The seed virus is inoculated to the RK cells in Roux bottles of 500 ml. capacity and processed in the same manner as in Example 1 by the use of a serum-free Tc medium 199, to give a highly attenuated rubella virus vaccine. Thus-obtained vaccine shows a rubella virus titer of $10^{4.3}$ InD$_{50}$/ml. assayed with the same system as in Example 1.

In the same manner as in Example 1, the product is frozen for storage, and therafter thawed and used for vaccination.

EXAMPLE 5

0.2 ml. of 100-fold-diluted fluid of rubella virus, Strain Yo–25, passaged 5 times with AGMK cells, is inoculated in a GPK cell culture in bottles of 50 ml. capacity, which is prepared in the same manner as in Example 1. The inoculum is incubated under the same conditions as stated in Example 1. Thus, the passage with the GPK cell culture is repeated 24 times, and the culture fluid of the 24th culture is centrifuged to obtain a highly attenuated seed virus for the production of a rubella virus vaccine.

The seed virus is inoculated to the RK cells in Roux bottles of 500 ml. capacity and preccessed in the same manner as in Example 1, to give a highly attenuated rubella virus vaccine. Thus-obtained vaccine shows a rubella virus titer of $10^{4.2}$ InD$_{50}$/ml., assayed with the same system as in Example 1.

In the same manner as in Example 1, the product is frozen for storage, and thereafter thawed and used for vaccination.

EXAMPLE 6

0.2 ml. of 100-fold-diluted fluid of rubella virus, Strain To–336 passaged seven times with AGMK cells, is inoculated in a GPK cell culture in bottles of 50 ml. capacity, which is prepared in the same manner as in Example 1. The inoculum is incubated under the same conditions as stated in Example 1. Thus, the passage with the GPK cell culture is repeated 20 times with the application of the limiting dilution technic in the manner as described in Example 2 to the fifth passage and the 18 passage.

Thus-obtained highly attenuated seed virus is allowed to be further adaptive to the RK cell culture by two passages with the same, and then is inoculated to the RK cells in Roux bottles of 500 ml. capacity and processed in the same manner as in Example 1, to give a highly attenuated rubella virus vaccine. Thus-obtained vaccine shows a rubella virus titer of $10^{4.1}$ InD$_{50}$/ml. assayed with the same system as in Example 1.

In the same manner as in Example 1, the product is frozen for storage, and thereafter thawed and used for vaccination.

TEST 1

The highly attenuated rubella virus vaccines produced according to Example 1 to 6 were subjected to tests in the manner prescribed in Section 73.114 of Public Health Service Regulations, Title 42, Part 73, U.S.A. for safely tests of "poliomyelitis vaccine, live, oral", and after the manner prescribed in Section 73.73 of the same regulations for sterility tests.

As the results of inoculation tests in various animals (i.e. rabbits, adult mice, suckling mice and guinea pigs), tissue culture tests with various primary cells (i.e. monkey kidney, human amnion, human kidney and rabbit kidney) and negative tests of adventitious agents, it was confirmed that the tested vaccines satisfied every requirement of the above-referred Regulations.

TEST 2

In this test the attenuation of rubella virus attained by passages with the GPK cell culture was compared with that attained by passages with the RK cell culture, the latter being employed as the representative of the hitherto known cells for the attenuation of the rubella virus.

Each of the rubella virus Strain To–336 passaged seven times with AGMK cells and Strain Yo–25 passaged five times with AGMK cells was subjected to 30 times of passages with the GPK cells under the same conditions as in Example 1, respectively. As the control runs, the said two strains were subjected to 30 times of passages with the RK cells under the same conditions as above.

The lowering of the rubella virus virulence with the lapse of passages was determined with regard to the respective passage systems in the following manner:

The respective virus fluids of the first, fifth, 10th, 15th, 20th, 25th and 30th cultures were subcutaneously inoculated to rhesus monkeys, rabbits and guinea pigs in a dose of $5 \times 10^3$ TCID$_{50}$ per animal. Clinical reaction, rubella virus antibody titer of animal sera and rubella virus isolation from the throat swabs were determined with regard to the respective inoculate animals.

Clinical reaction: Rashes and other symptoms attributed to the inoculation were observed during 3 weeks immediately subsequent to the inoculation.

Rubella virus antibody titer: Serum samples of animals were collected on 21st day after the inoculation and Hemagglutination Inhibition (HAI) titer was determined with regard to the respective samples by Stewart et al method described in "New Eng. J. Med.", 276, 554–557, 1967.

Rubella virus isolation from the throat swabs: During 17 days starting from fifth day after the inoculation, throat swabs were collected from all the animals and examined by Parkman et al method described in "New Eng. J. Med.", 275, 569–574, 1966.

The results are summarized in Tables 1 and 2.

in the GPK cell culture with the application of the limiting dilution technic to the third passage, sixth passage and ninth passage in the manner described in Example 6.

The lowering of the rubella virus virulence with the lapse of passages was determined in the manner described in Test 2.

The results are summarized in Table 3.

Table 3

| Inoculated animal | Rhesus monkey | | | Rabbit | | | Guinea pig | | |
|---|---|---|---|---|---|---|---|---|---|
| Passage history | Clinical reaction | HAI titer | Virus isolation from throat swabs | Clinical reaction | HAI titer | Virus isolation from throat swabs | Clinical reaction | HAI titer | Virus isolation from throat swabs |
| GKP-1 | — | 1:512 | + | — | 1:256 | — | — | 1:256 | — |
| GPK-5 | — | 1:64 | — | — | <1:8 | — | — | <1:8 | — |
| GPK-10 | — | <1:8 | — | — | <1:8 | — | — | <1:8 | — |
| GPK-15 | — | <1:8 | — | — | <1:8 | — | — | <1:8 | — |
| GPK-20 | — | <1:8 | — | — | <1:8 | — | — | <1:8 | — |

Table 1

(Strain To–336)

| Inoculated animal | Rhesus monkey | | | Rabbit | | | Guinea pig | | |
|---|---|---|---|---|---|---|---|---|---|
| Passage history | Clinical reaction | HAI titer | Virus isolation from throat swabs | Clinical reaction | HAI titer | Virus isolation from throat swabs | Clinical reaction | HAI titer | Virus isolation from throat swabs |
| GPK-1 | — | 1:512 | + | — | 1:256 | — | — | 1:256 | — |
| GPK-5 | — | 1:256 | + | — | 1:32 | — | — | 1:32 | — |
| GPK-10 | — | 1:128 | — | — | <1:8 | — | — | <1:8 | — |
| GPK-15 | — | 1:16 | — | — | <1:8 | — | — | <1:8 | — |
| GPK-20 | — | <1:8 | — | — | <1:8 | — | — | <1:8 | — |
| GPK-25 | — | <1:8 | — | — | <1:8 | — | — | <1:8 | — |
| GPK-30 | — | <1:8 | — | — | <1:8 | — | — | <1:8 | — |
| RK-1 | — | 1:1024 | + | — | 1:512 | — | — | 1:128 | — |
| RK-5 | — | 1:256 | + | — | 1:128 | — | — | 1:128 | — |
| RK-10 | — | 1:128 | + | — | 1:64 | — | — | 1:64 | — |
| RK-15 | — | 1:64 | — | — | 1:16 | — | — | 1:32 | — |
| RK-20 | — | 1:16 | — | — | <1:8 | — | — | <1:8 | — |
| RK-25 | — | 1:8 | — | — | <1:8 | — | — | <1:8 | — |
| RK-30 | — | 1:8 | — | — | <1:8 | — | — | <1:8 | — |

Table 2

(Strain Yo–25)

| Inoculated animal | Rhesus monkey | | | Rabbit | | | Guinea pig | | |
|---|---|---|---|---|---|---|---|---|---|
| Passage history | Clinical reaction | HAI titer | Virus isolation from throat swabs | Clinical reaction | HAI titer | Virus isolation from throat swabs | Clinical reaction | HAI titer | Virus isolation from throat swabs |
| GPK-1 | — | 1:512 | + | — | 1:256 | — | — | 1:256 | — |
| GPK-5 | — | 1:256 | + | — | 1:128 | — | — | 1:256 | — |
| GPK-10 | — | 1:256 | + | — | 1:32 | — | — | 1:16 | — |
| GPK-15 | — | 1:64 | — | — | 1:16 | — | — | 1:16 | — |
| GPK-20 | — | 1:8 | — | — | <1:8 | — | — | <1:8 | — |
| GPK-25 | — | <1:8 | — | — | <1:8 | — | — | <1:8 | — |
| GPK-30 | — | <1:8 | — | — | <1:8 | — | — | <1:8 | — |
| RK-1 | — | 1:512 | + | — | 1:256 | — | — | 1:128 | — |
| RK-5 | — | 1:512 | + | — | 1:128 | — | — | 1:256 | — |
| RK-10 | — | 1:128 | + | — | 1:128 | — | — | 1:128 | — |
| RK-15 | — | 1:256 | — | — | 1:128 | — | — | 1:64 | — |
| RK-20 | — | 1:128 | — | — | 1:64 | — | — | 1:128 | — |
| RK-25 | — | 1:128 | — | — | 1:32 | — | — | 1:64 | — |
| RK-30 | — | 1:64 | — | — | 1:8 | — | — | 1:64 | — |

TEST 3

The rubella virus Strain To 336 passaged seven times with AGMK cells was subjected to 20 times of passages

What is claimed is:

1. In a method for attenuating rubella virus which comprises subjecting rubella virus to passages in a tissue culture and ceasing said passages when sufficient attenuation is attained, the improvement wherein the passages are conducted in a tissue culture containing primary kidney cells of guinea pig at least 10 times.

2. The method according to claim 1, wherein the passages are conducted at as temperature of about 28°C to about 36°C.

3. The method according to claim 1, wherein the passages are conducted with at least one application of a limiting dilution.

4. The method according to claim 1, wherein the passages are conducted with the insertion of one to five times of passages in a tissue culture containing embryo cells of quail.

5. The method according to claim 1, wherein the rubella virus is Strain To-336.

* * * * *